United States Patent [19]

Franco

[11] 3,846,708

[45] Nov. 5, 1974

[54] DIGITAL DEMODULATION OF FREQUENCY-SHIFT KEYED DATA SIGNALS

[75] Inventor: John Vincent Franco, Middletown, N.J.

[73] Assignee: Bell Telephone Laboratories, Incorporated, Murray Hill, Berkeley Heights, N.J.

[22] Filed: Mar. 15, 1973

[21] Appl. No.: 341,454

[52] U.S. Cl. .................... 329/104, 178/88, 325/320, 325/323

[51] Int. Cl. .............................................. H041 27/14

[58] Field of Search ...... 329/50, 104; 325/320, 323, 325/324; 178/88

[56] References Cited

UNITED STATES PATENTS 3,600,680 8/1971 Maniere .......................... 325/320 X 3,611,298 10/1971 Jacobson ........................ 325/320 X 3,636,454 1/1972 Pasternack et al. ................ 325/320

*Primary Examiner*—Alfred L. Brody

*Attorney, Agent, or Firm*—C. S. Phelan; J. P. Kearns

[57] ABSTRACT

A digital frequency-shift keyed signal demodulator continuously measures the duration of successive cycles of a received data signal wave, compares pairs of duration measurements to determine the occurrence of a data-wave transition, and closely approximates the time of occurrence of the data-wave transition by linearly interpolating over the interval between successive duration measurements in accordance with their relative magnitudes. The interpolated interval value is applied as a time delay to the demodulated data wave to obtain a transition substantially free of phase jitter. The principle is applicable to single-channel cases directly and to multichannel cases through time-division techniques.

11 Claims, 10 Drawing Figures

DIGITAL DEMODULATION OF FREQUENCY-SHIFT KEYED DATA SIGNALS

FIELD OF THE INVENTION

This invention relates generally to the demodulation of frequency-shift keyed message-data signals and more specifically to method and apparatus for demodulating such signals by measuring the duration of each cycle of the frequency-shift keyed signal.

BACKGROUND OF THE INVENTION

In modern data systems, transmission to a remote point is often achieved by using a telephone line for transmitting frequency-shift keyed (FSK) signals. In frequency-shift keying each data state is assigned a discrete frequency for transmission over a band-limited channel. These channel bandwidth limitations preclude abrupt frequency changes between data intervals. Thus, practical FSK signals exhibit gradual inter-digital frequency transitions.

An FSK signal received at the remote point must be demodulated to recover the original digital data signal. FSK demodulation inherently involves three operations — the determination of instantaneous frequency, the detection of the corresponding discrete frequency state, and the translation from frequency state to correct data state. Instantaneous frequency is commonly determined by measuring the duration of each cycle of the received signal. The nearest allowable discrete frequency is then ascertained by comparing this duration with predetermined threshold values. The production of the digital signal itself is achieved by other conventional means, such as slicers.

The digital signal obtained by this demodulation method of measuring time intervals between zero-crossing transitions in the received signal is disadvantageous because the necessity of detecting all data state changes at the completion of a cycle of the received signal causes substantial data phase jitter. In the FSK signal the channel frequency changes continuously in its transition between successive digit intervals. Thus, the true data state transition coincides only randomly relative to a zero-crossing transition in the received channel signal, and undesirable data phase jitter results.

It is therefore an object of this invention to reduce the data phase jitter incurred when demodulating FSK signals by measuring the durations of cycles of the received channel signal.

Prior art attempts to reduce the aforementioned phase jitter have centered on integrating successive duration measurements and basing data decisions on the integrated signal. In this manner data state changes can be detected at any point in the cycle of the carrier signal. U.S. Pat. No. 3,600,680 issued to M. A. Maniere and J. K. Meile on Aug. 17, 1971, teaches the determination of the duration of a cycle of a received frequency by digital means. The digital signal indicative of the period is converted to analog form by a digital-to-analog converter and the analog signal is integrated and compared to a threshold level to determine the data state. Only cycle duration is determined digitally. The digital-to-analog converter, integrator and threshold detector are analog circuits. This demodulator is therefore bulky, expensive, and overly dependent on component values.

It is a further object of this invention to provide a compact FSK demodulator of the zero-crossing detection type which is completely digital.

In large data systems, such as airline reservation systems, many FSK data channels are terminated at a single data-processing receiver, which includes a multiple data-set installation. Savings in size and cost and the reduction in complexity of the multiple data set are obtained by employing equipment which can be used in common by all the data channels in accordance with the principle of time-division multiplexing.

Another object of this invention is to reduce the size, cost, and complexity of multiple data sets by providing a compact, efficient, all-digital, time-multiplexed FSK demodulator.

SUMMARY OF THE INVENTION

According to this invention, the instant of occurrence of data transitions between different frequency states (e.g., marking and spacing frequencies in a binary signal) in a frequency-shift keyed data transmission system is accurately determined by monitoring and comparing the durations of successive cycles of received signals and, on the basis of the straddling of a threshold defining the boundary between adjacent allowable discrete frequency states by successive measured durations, interpolating therebetween to estimate closely a delay amount to be applied to demodulated data transitions. Phase jitter in the data transitions is thus reduced according to this invention because the interpolation feature frees the data transition from direct dependence on the occurrence of a nonharmonically related carrier wave transition.

In accordance with one illustrative embodiment of this invention, the durations of successive cycles of a received single-channel binary FSK signal are measured against the counts of a high-speed clock operating at more than twice the higher of the assigned marking or spacing frequencies. Each measured count is compared with a threshold count corresponding to the mean of the assigned marking and spacing frequencies to determine the occurrence of a change between marking and spacing data states. Whenever a data state change is deemed to have occurred, a linear interpolation is made between successive duration counts to ascertain the probable delay period between successive cycle zero-crossings at which the data state change occurred. The transition in the recovered data is delayed by the interpolated amount in addition to the inherent measurement delay. This arrangement guarantees a stable, jitter-free transition in recovered data wave.

In accordance with another illustrative embodiment of this invention, a plurality of unsynchronized FSK signal waves in a multiple data set arrangement are processed simultaneously on a time-division multiplex basis with time sharing of the duration-timer, interpolator and variable delay. Storage of successive duration counts and data states is accomplished in sequenced multibit shift registers.

It is a feature of this invention that the interaction between an interpolator and a variable delay element facilitates the reduction of phase jitter in the output signal of an FSK demodulator of the type measuring the duration of each cycle of the carrier signal.

It is another feature of this invention that the FSK demodulator consists entirely of digital logic circuits and is amenable to implementation using large-scale integrated circuit techniques.

Yet another feature of this invention is that it is possible to use the same demodulator circuit for a wide range of carrier frequencies, the maximum frequency being limited only by the speed capability of the logic circuits employed.

It is yet another feature of this invention that a change in the range of operative carrier frequencies does not require a change in the internal components of the demodulator. All that is required is an appropriate change in the clock pulse frequency.

It is a still further feature of this invention that a multiple FSK signal demodulator for any number $m$ of unsynchronized FSK signal waves can be obtained by replacing each flip-flop in the single-channel demodulator with a shift register having $m$ stages.

BRIEF DESCRIPTION OF THE DRAWING

The objects, features, and advantages of this invention will be more fully appreciated from the following detailed description and the drawing in which.

DESCRIPTION OF THE PREFERRED EMBODIMENTS

Figure 1:
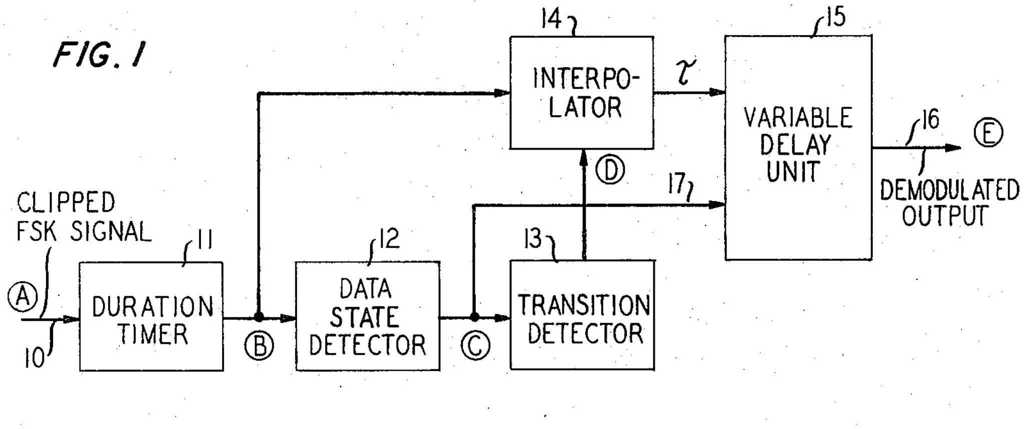
FIG. 1 is a block schematic diagram of a frequency-shift keyed signal demodulator according to this invention.

FIG. 1 is a block diagram illustrating the configuration of a demodulator for frequency-shift keyed signals according to this invention. The FSK signal applied to the demodulator on lead 10 is assumed to have been squared-up by conventional means, not shown. The demodulator broadly comprises: duration timer 11 driving data state detector 12, transition detector 13 responsive to the output of data state detector 12, interpolator 14 jointly responsive to the outputs of duration timer 11 and transition detector 13 and variable delay unit 15 jointly responsive to the outputs of data state detector 12 and interpolator 14. The demodulated signal appears on output line 16.

Figure 2:
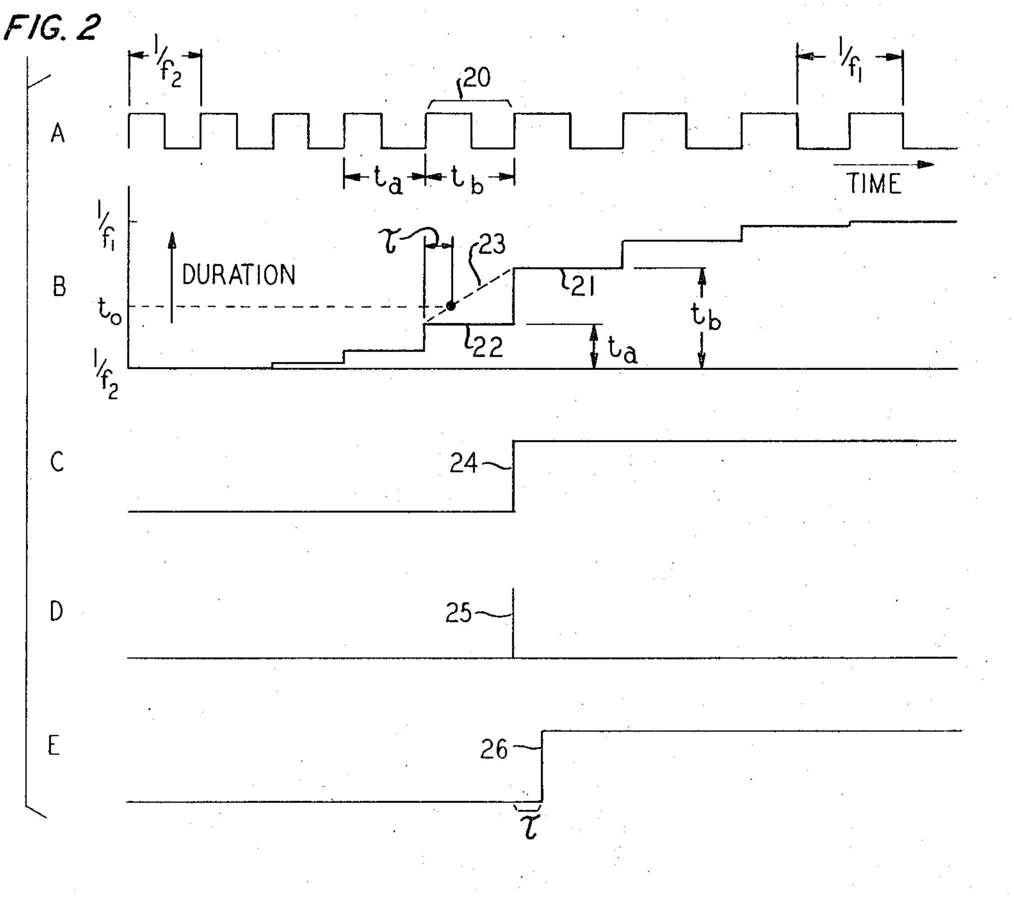
FIG. 2 is a waveform chart useful in explaining the block diagram of FIG. 1.

The encircled letters of FIG. 1 are keyed to the waveform diagram of FIG. 2, which indicates time progressing to the right. The ordinates are response amplitude in all waveforms except B, where a time duration measurement is so indicated.

In operation, for example with a binary FSK signal, the signal frequency varies continuously between the marking and spacing frequencies $f_1$ and $f_2$ about an average or threshold value $f_0$. Duration timer 11 measures the duration of each cycle of the input signal, a representative portion of which is illustrated in FIG. 2 as waveform A. In FIG. 2 duration value 21 of waveform B corresponds to the duration $t_b$ of just-completed cycle 20 of waveform A, whereas value 22 corresponds to the duration $t_a$ of the preceding cycle. Data state detector 12 compares each duration measurement to a threshold value $t_0$ to determine whether a mark or a space has been received. In waveform B the duration $t_a$ of step 22 is below threshold $t_0$, whereas the duration $t_b$ of step 21 exceeds $t_0$. As a result, waveform C at the output of data state detector 12 responds to transition 24 at the end of cycle 20. Waveform D results from the differentiation of waveform C. Pulse 25 coincides with transition 24 in waveform C. It should be noted that, since waveform A is continuously changing in frequency, value $t_a$ is really the duration of the received signal cycle immediately preceding cycle 20 and value $t_b$ is the duration of the cycle itself. During cycle 20 the reciprocal of the instantaneous frequency might actually be varying, as shown by broken line 23 with a positive slope. Thus, the crossing of threshold $t_0$ indicating the true data transition actually occurs $\tau$ seconds after the beginning of cycle 20 and transition 24 occurring at the end of cycle 20 does not coincide with the actual data transition. Value $\tau$ is a measure of this lack of coincidence and can be nearly as great as the duration of cycle 20. It is the reliance on carrier transitions to time data transitions that causes the timing jitter in digital FSK demodulators employing the basic technique of measuring successive cycle durations.

According to this invention, the aforementioned jitter is substantially reduced by delaying transition 24 by $\tau$ seconds to produce transition 26 as shown in waveform E. Accordingly, transition detector 13 responds to transition 24 to produce pulse 25 in waveform D. Pulse 25 enables interpolator 14, which interpolates between duration values 21 and 22 to determine the instant $\tau$ at which threshold duration value $t_0$ is crossed. Interpolator 14 then sets the delay of variable delay 15 equal to $\tau$ seconds so as to delay by $\tau$ seconds the transition 24 available on lead 17 as shown in waveform C. Waveform E resulting on line 16 has the substantially correct data phase with a one-cycle delay.

Mention should be made of the method of interpolation. By way of example, it is assumed that dashed line 23 in waveform B of FIG. 2 is a straight line (i.e., interpolator 14 performs a linear interpolation). The following relationship can then be shown by the method of similar triangles to exist:

$$\tau / t_a = t_0 - t_a / t_b - t_a. \tag{1}$$

The use of the absolute magnitudes of numerator and denominator of the right-hand side of equation (1) permits the use of this equation when the FSK signal is decreasing in frequency (as diagrammed in FIG. 2). For increasing frequency progression, the algebraic signs of the numerator and denominator are merely reversed.

In more general form, accordingly, the interpolating equation for $\tau$ is written as $$\tau = t_a \quad t_0 - t_a \ / \ t_b - t_a \ . \tag{2}$$

From the foregoing description, it is apparent that the method of demodulating an FSK signal, taught by this invention, includes the steps of:

a. measuring the duration of every cycle of the received carrier signal,
b. resolving each duration into its corresponding data state,
c. interpolating between duration measurements whenever consecutive measurements resolve to different data states to estimate the time interval between the first measurement and the true instant for the occurrence of the data state transition, and
d. producing a digital signal in which the data state change is delayed by the estimated time interval from the last transition in the carrier signal.

Figures 3A, 4:
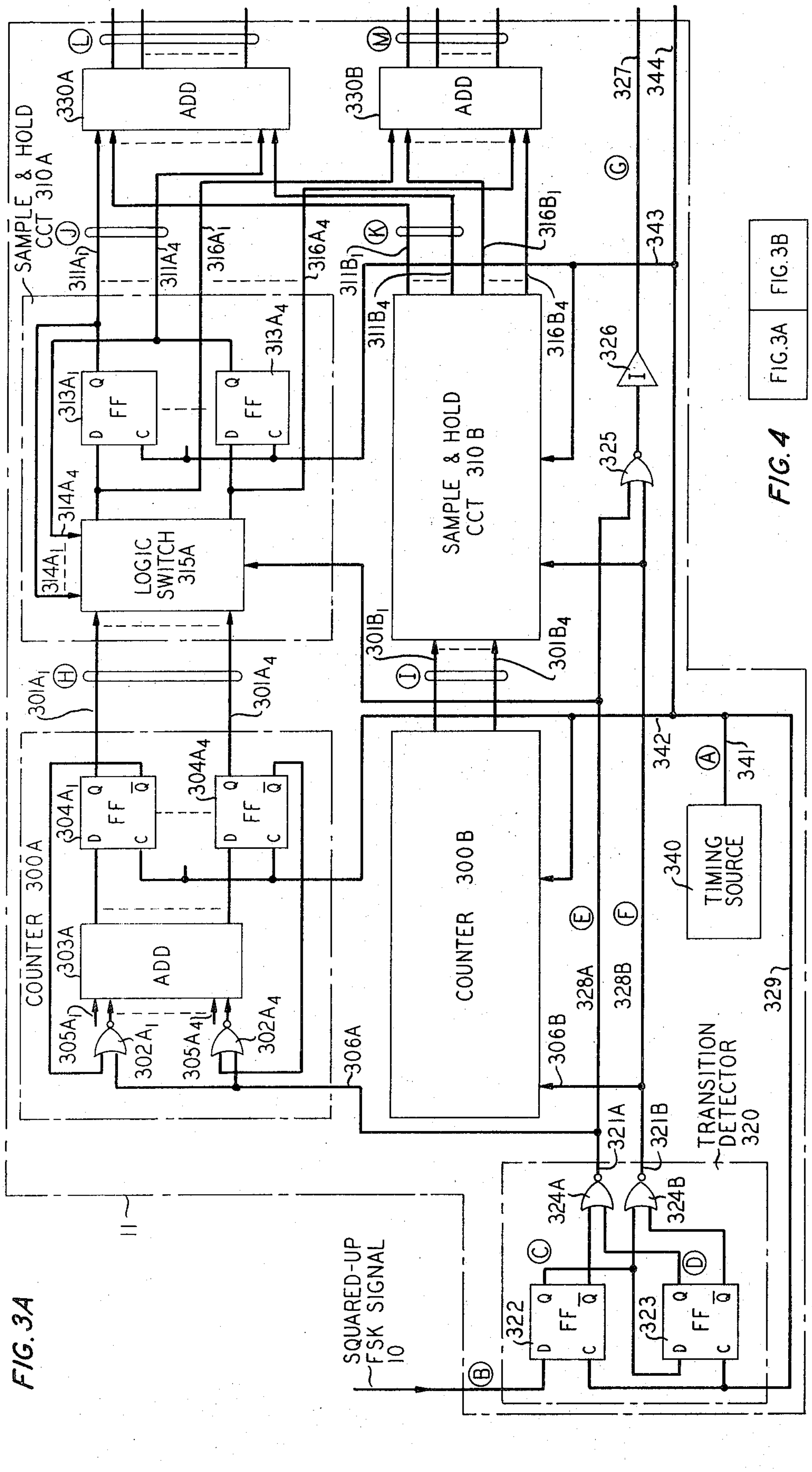
FIGS. 3A and 3B, when arranged as shown in FIG. 4, provide a block schematic diagram of an illustrative embodiment of a digital demodulator for a single-channel binary FSK signal.
Figure 3B:
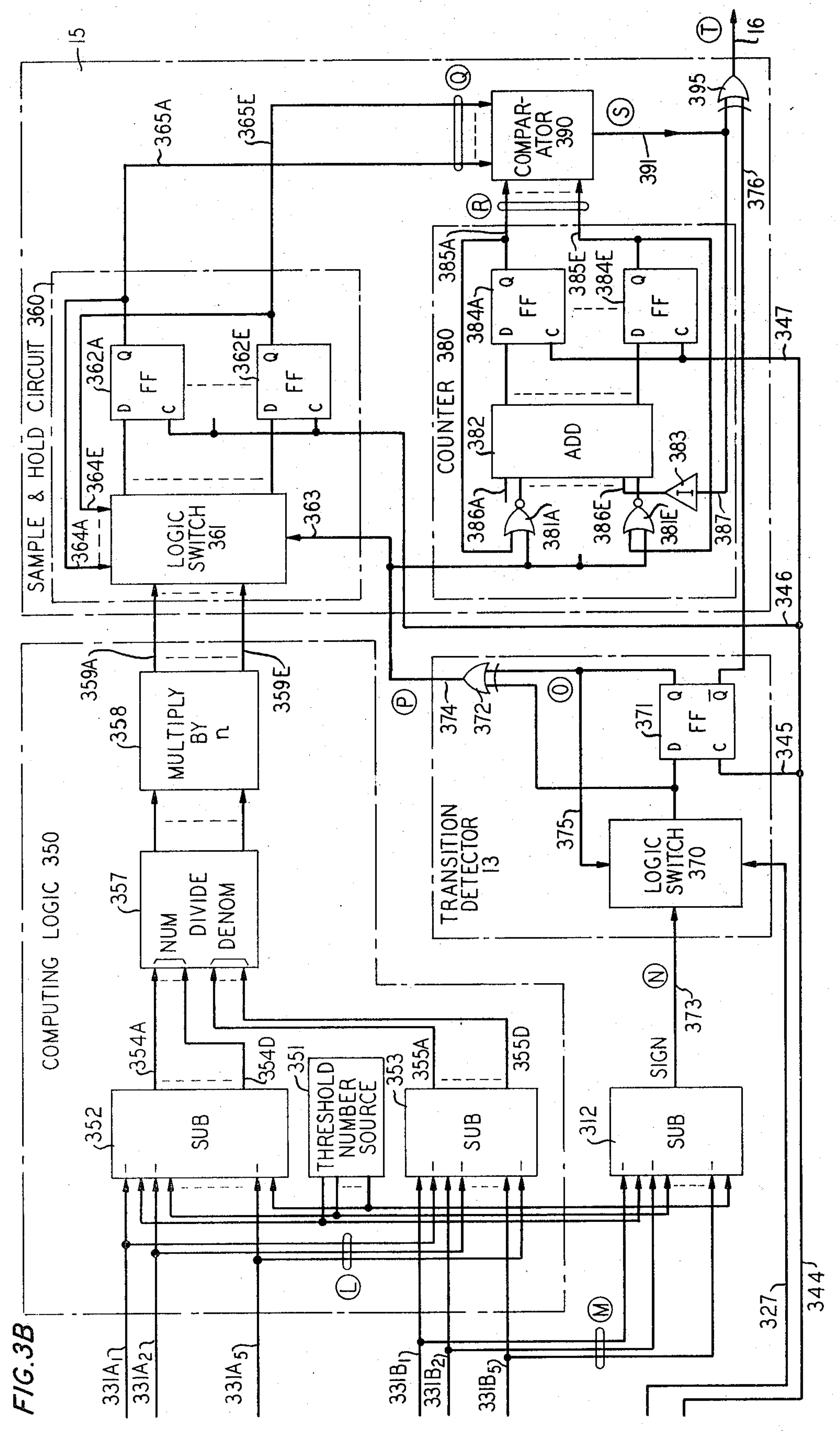

FIGS. 3A and 3B, when arranged as shown in FIG. 4, provide a detailed block schematic diagram of an illustrative embodiment of the invention useful for demodulating binary FSK signals. In this embodiment exemplary marking and spacing frequencies of 1,070 Hz and 1,270 Hz are employed. Duration measurements are performed on both succeeding positive-going (positive) and negative-going (negative) transitions of the FSK signal, i.e., between successive positive and between successive negative transitions, and, consecutive pairs of measurements are averaged to reduce the effects of noise. Linear interpolation is performed between successive averaged durations using the duration of an 1,170 Hz signal as the threshold value $t_0$. This demodulator is entirely digital. Throughout the drawing identical circuits are often separately grouped and, on occasion, it may be convenient alternatively, to refer to these groups or to the individual members. To facilitate such references, all the members of a group bear the same numerical designation but are assigned different alphabetic suffixes identifying individual members. Thus, an expression such as "counters 300" is a collective reference to the group comprising two individual members, i.e., counters 300A and 300B. Similarly, when a member of a group is itself composed of a plurality of identical elements, its components are distinguished by numerical subscripts. Consequently, an expression such as "leads 311A" is a collective reference to the group member further comprising leads $311A_1$ through $311A_4$.

The digital demodulator comprises broadly the combination of transition detector 320, timing source 340, counters 300, sample and hold circuits 310, and adders 330 performing the functions of duration timer 11 of FIG. 1; subtractor 312 providing the function of data state detector 12 of FIG. 1; computing logic 350 providing the function of interpolator 14; transition detector 13, corresponding to the similarly numbered element of FIG. 1; and the combination of hold circuit 360, counter 380, comparator 390, and Exclusive-OR gate 395 performing the function of variable delay unit 15 of FIG. 1.

The enumerated elements of the digital demodulator include one or more of the logic building blocks described below. An inverter performs the Boolean function of complementation producing $\bar{A}$ when the input A is applied. A NOR-gate performs the complemented OR function $\overline{A+B}$ when inputs A and B are applied. An Exclusive-OR (X-OR) gate performs the function $A \oplus B = A\bar{B} + \bar{A}B$ when inputs A and B are applied. A binary ADDER performs the arithmetic addition of two k-bit binary numbers producing a $k+1$ bit binary number. A binary subtractor takes the arithmetic difference of two k-bit binary numbers producing a $k+1$ bit binary number in which the most significant bit represents the sign and the $k$ least significant bits the magnitude of the difference.

In addition, the embodiments of this invention employ two types of storage elements: D flip-flops, and shift registers. A D flip-flop has a clock input C, a data input D, and complementary outputs Q and $\bar{Q}$. In operation, the Q output assumes the value of the D input under control of the C input, i.e., on the leading transition of the clock input signal the Q output signal changes to the value that D had prior to the occurrence of the clock transition. A shift-register has a data input D, a clock input C and complementary outputs Q and $\bar{Q}$. Essentially, it comprises a plurality of serially connected flip-flops (stages) through which input data bits are consecutively shifted on the positive transitions of consecutive clock pulses. In this manner, a $k$ stage shift-register realizes a delay of $k$ clock periods.

Figure 5A:
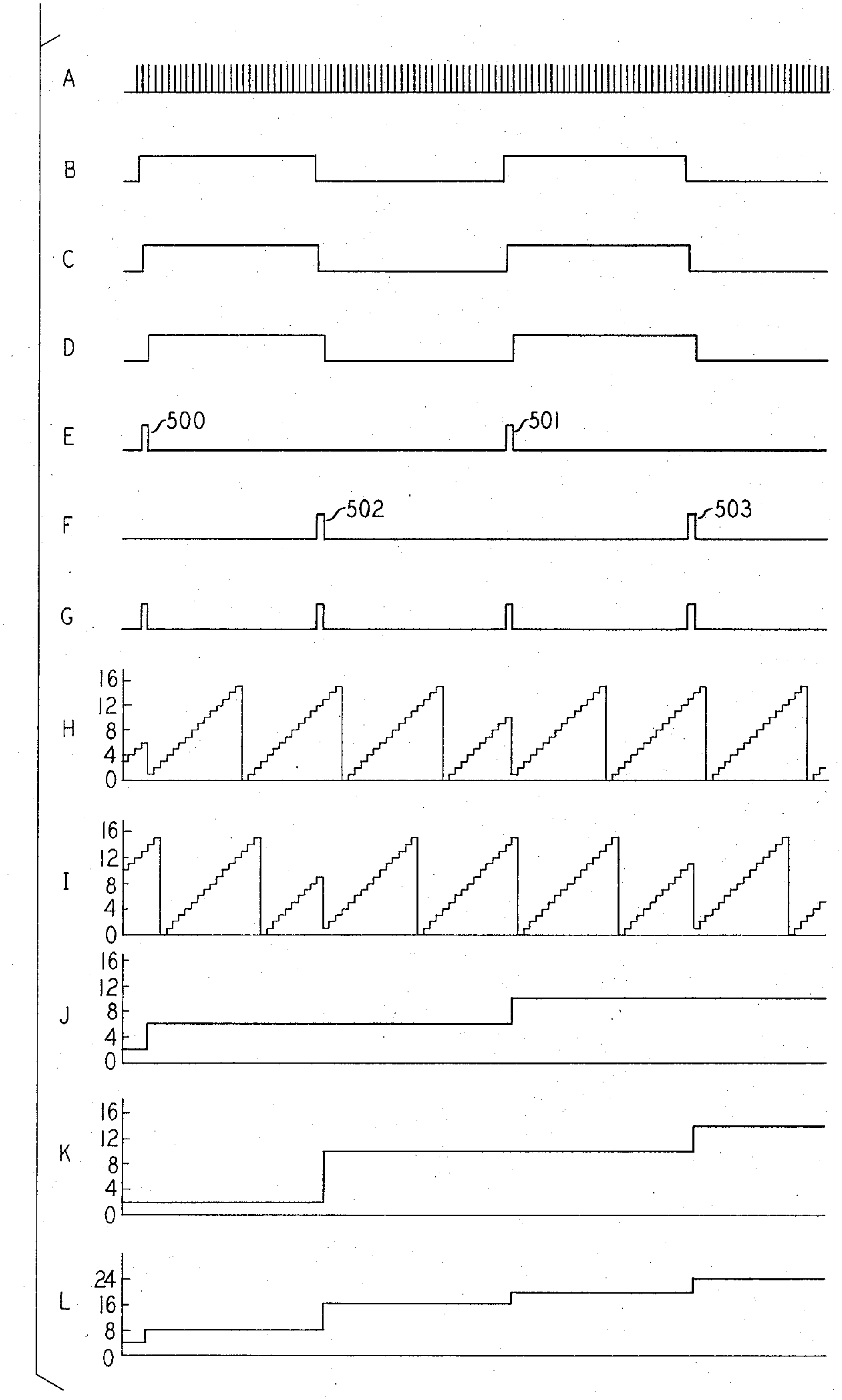
FIGS. 5A and 5B, when arranged as shown in FIG. 6, provide a waveform chart useful in explaining the operation of the illustrative embodiment of FIGS. 3A and 3B.
Figure 5B:
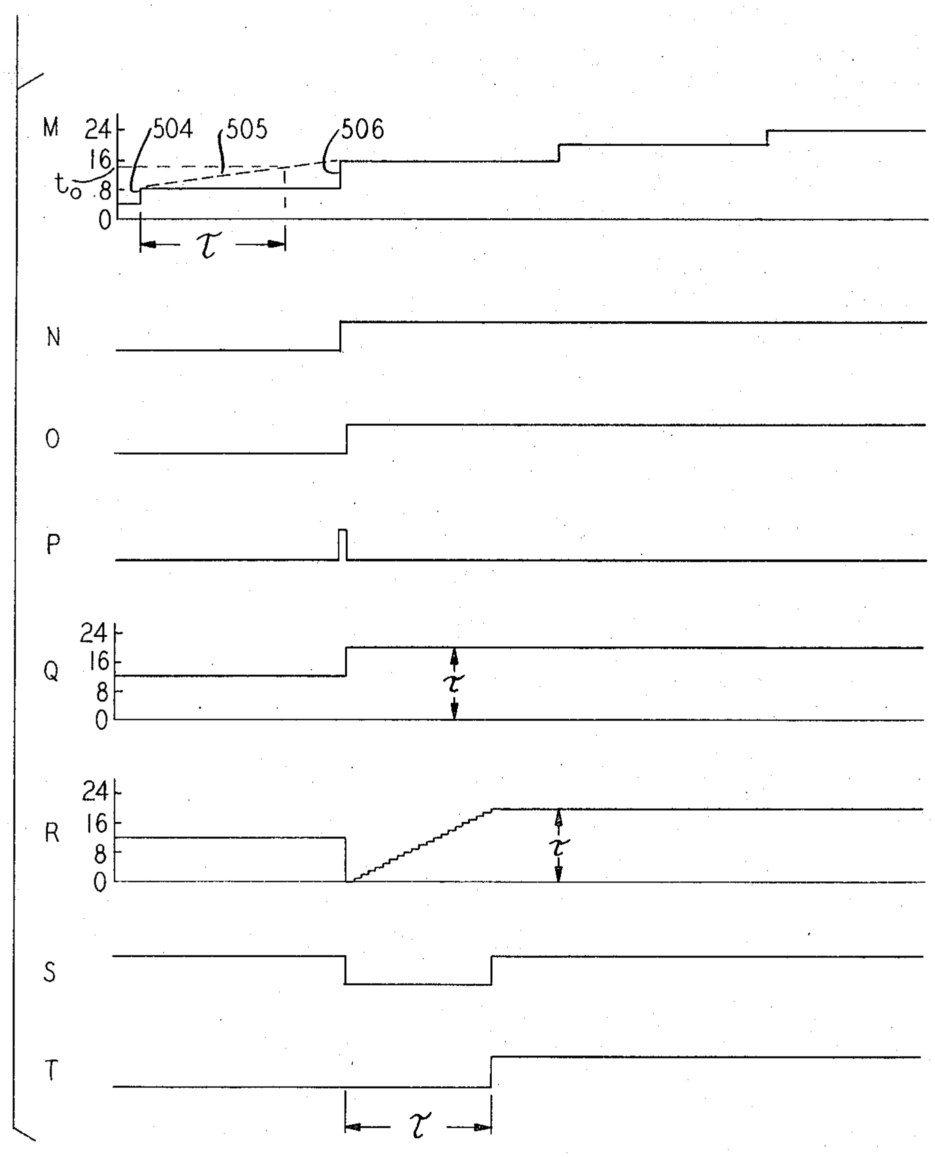
Figure 6:
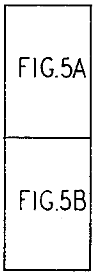

The circled letters in FIGS. 3A and 3B are keyed to the waveform diagrams obtained by arranging FIGS. 5A and 5B as shown in FIG. 6.

Transition detector 320 further comprises flip-flops 322 and 323, and NOR gates 324. The outputs of NOR gates 324 are applied to NOR gate 325, to counters 300 and to sample and hold circuits 310. Timing source 340 is a free-running oscillator having an exemplary frequency of 64 kHz. This oscillator produces the basic digital clock signal for the entire demodulator. This signal is conveniently represented as a train of impulses as shown on line A of FIG. 5A. Each impulse corresponds to a positive transition of the clock signal, and is the significant part of the signal. Counters 300 further comprise NOR gates 302, adders 303, and flip-flops 304. Counters 300 provide a binary count of the number of clock pulses to sample and hold circuits 310. Sample and hold circuits 310 further comprise logic switches 315 and flip-flops 313. The outputs of logic switches 315 are provided to adder 330B and the outputs of flip-flops 313 are provided to adder 330A. The sums produced by adders 330 are provided to computing logic 350 and the sum produced by adder 330B is applied to subtractor 312. Computing logic 350 comprises threshold number source 351, subtractors 352 and 353, divider 357, and multiplier 358. The output of computing logic 350 is provided to sample and hold circuit 360. The sign output of subtractor 312 is provided to transition detector 13 over lead 373; the magnitude output is not used. Hold circuit 360 comprises logic switch 361, and flip-flops 362. The outputs of flip-flops 362 are provided to comparator 390.

Transition detector 13 comprises logic switch 370, flip-flop 371 and Exclusive-OR gate 372. The output of X-OR gate 372 is provided to counter 380 and sample and hold circuit 360. Counter 380 comprises NOR gates 381, adder 382, inverter 383, and flip-flops 384. The outputs of flip-flops 384 are provided to comparator 390. Comparator 390 provides a logical 1 output when the signals from flip-flops 362 and 384 are the same. The signal from comparator 390 is provided to X-OR gate 395 and counter 380. The output of X-OR gate 395 is the output from the demodulator.

It should be noted that, in the present embodiment, the number of clock pulses occurring during a cycle of the FSK signal will always be between 50 and 60 (e.g., the binary numbers appearing at the output of counters 300 will always be between 110010 and 111100). Since the two most significant bits of all the numbers in this range are always 1s, these bits supply no additional information and a 4-bit representation of the last four bits suffices. Consequently, counters 300 are only 4-bit counters. It should be kept in mind that 4- and 5-bit numbers will therefore represent all quantities of interest.

The clock signal from timing source 340 is provided to the C inputs of flip-flops 304 by way of leads 341 and 342, to the C inputs of flip-flops 322 and 323 by way of leads 341 and 329, to the C inputs of flip-flops 313 by way of leads 341 and 343, to the C input of flip-flop 371 by way of leads 341, 343, 344, and 345, to the C inputs of flip-flops 362 by way of leads 341, 343, 344, and 346, and to the C inputs of flip-flops 384 by way of leads 341, 343, 344, 346, and 347.

The operation of the demodulator of FIGS. 3A and 3B is conveniently explained in conjunction with the waveform diagrams of FIGS. 5A and 5B.

A binary FSK signal squared up by conventional means, not shown, is applied over lead 10 to the D input of flip-flop 322. This FSK signal represented by waveform B in FIG. 5A is not synchronized to the clock signal shown as waveform A. Flip-flop 322 produces waveform C, a replica of the FSK signal at its normal (Q) output synchronized with the next clock pulse. The synchronized FSK signal is applied to the D input of flip-flop 323 and incurs a delay of one clock period in being transferred to the Q output thereof. The Q output of flip-flop 323 and the inverted $\overline{Q}$ output of flip-flop 322, applied to the inputs of NOR gate 324A, produce a logical 1 (high state) output on this NOR gate when waveform C is high and waveform D is low. Waveform E, as produced by NOR gate 324A, thus contains a pulse having the duration of a full clock period, corresponding to each positive transition of waveform C. Similarly, waveform F produced by NOR gate 324B contains a pulse corresponding to each negative transition of waveform C. These pulses are hereinafter referred to as sampling pulses. Waveform E is applied to NOR gates 302A in counter 300A via leads 321A and 306A and to logic switch 315A in sample and hold circuit 310A and NOR gate 325 via leads 321A and 328A. Waveform F is provided to NOR gates 302B (not shown in figure) of counter 300B via leads 321B and 306B and to a logic switch 315B (not shown) in sample and hold circuit 310B and NOR gate 325 via leads 321B and 328B. NOR gate 325 and inverter 326 combined perform a logical OR function producing waveform G having a pulse corresponding to each transition of waveform C.

Lines 301 from counters 300 produce binary readouts of the number of clock cycles encountered since the last sampling pulse. Lines H and I of FIG. 5A are quantized composite analog representations of these readouts. The complements of these readouts are fed back to the inputs of NOR gates 302. In the absence of a sampling pulse of lines 306, the fedback readouts experience an inversion in passing through NOR gates 302. Thus, the readout of each of counters 300 is provided as an input to adders 303 through NOR gates 302. The other inputs to adders 303 provided on leads 305, e.g., 305$A_1$ through 305$A_4$ of counter 300A represent the binary number 0001. This number is provided by wiring the least significant bit (subscript 4) to the logical 1 level potential (not shown) and wiring all others of leads 305$A_{1-3}$ to the logical 0 level potential. The same arrangement although not shown is provided by lead 305$B_1$ through 305$B_4$ for counter 300B. Consequently, the sum outputs of adders 303 provided to the D inputs of flip-flops 304 always exceed by 1 the readout of counters 300 on lines 301. When the next clock pulse occurs, the adder output is transferred to the Q outputs of flip-flops 304 to provide a new counter readout which exceeds the old readout by 1. This process results in the staircase waveforms appearing on lines H and I of FIG. 5A.

The effect of the sampling pulses will be described by reference to counter 300A. When a sampling pulse appears on line 306A, the outputs of NOR gates 302A all go low. Adder 303A then applies the binary number 0001 to flip-flops 304A and, on the next clock pulse, the readout on lines 301A will be reset to 0001. Referring to FIG. 5A, it can be seen that, following pulses 500 and 501 in waveform E, waveform H returns to the count 1 and that, following pulses 502 and 503 in waveforms F, waveform I returns to the count 1.

Sample and hold circuits 310 sample the readouts of counters 300 during each sampling-pulse interval and retain the sampled readouts in flip-flops 313 between sampling pulses, making them available on lines 311. Thus, the analog representations of the readouts shown in waveforms J and K of FIG. 5A experience a change at their respective sampling pulses and maintain constant values thereafter. The readouts retained in flip-flops 313 are fed back to logic switches 312 on lines 314. In the absence of sampling pulses, logic switches 315 transmit the fedback readouts to the D inputs of flip-flops 313 and these flip-flops maintain a constant readout. In the presence of a sampling pulse, the readouts of counters 300 are transmitted to the D inputs of flip-flops 313 and appear on lines 311 when the next clock pulse occurs (at the negative transition of the sampling pulse). Thus, during a sampling pulse, the presently held readouts appear on lines 311 and the next values of these readouts appear on lines 316.

To demonstrate operation of sampling circuits 310, reference is made to FIG. 5A. When sampling pulse 500 occurs in waveform E, logic switch 315A transmits the value of waveform H (the count 6 corresponding to 54 clock pulses) to flip-flops 313A. When the next clock pulse occurs, these flip-flops change state, causing waveform J to assume the value that waveform H had. This value is held until sampling pulse 501 ends.

Adder 330A adds the respective Q outputs of flip-flops 313A and 313B and adder 330B adds the respective D inputs to flip-flops 313A and 313B. These summations are equivalent to averaging the current duration measurement with the one obtained on the immediately preceding transition of the FSK signal. Thus, adder 330B produces a number on lines 331B representing the average cycle duration of the most recent cycle of the input FSK signal, whereas adder 330A produces a number of lines 331A representing the average cycle duration of the cycle ending with the FSK signal transition preceding the most recent one. In FIGS. 5A and 5B it can be seen that waveforms L and M representing respectively the numbers produced by adders 330A and 330B are identical, except that waveform L is delayed by one clock period with respect to waveform M as a result of passing through flip-flops 313.

Subtractor 312 subtracts the number produced by adder 330B from a number $t_0$ produced by the threshold number source 351. In this embodiment $t_0$ is 14 (corresponding to 110 clock pulses), the number adders 330 would produce with a 1,170-Hz input signal on line 10. Only the sign of the difference produced by subtractor 312 is of interest.

Referring to FIG. 5B, it can be seen that, as long as the difference is positive (waveform N below $t_0$), subtractor 312 produces a low signal on line 373 but, as soon as the difference becomes negative, waveform N goes high. Clearly, waveform N represents the data state corresponding to the most recently completed cycle of the FSK signal since it contains a logical 0 when the duration of the FSK signal is below $t_0$ and a logical 1 when it is above $t_0$.

On line 374 transition detector 13 produces waveform P having a pulse coincident with every transition in waveform N. The output of inverter 326 containing waveform G is applied via line 327 as a control to logic switch 370. Waveform G contains a pulse coincident with every transition of waveform C. In the absence of a pulse on line 327, logic switch 370 presents to the D input of flip-flop 371 the logic level fed back from the Q output of flip-flop 371 on line 375. In the presence of a pulse on line 327 logic switch 370 passes the level on line 373 to the D input of flip-flop 371. Effectively, waveform N is sampled in the presence of the pulses in waveform G and held between them. The waveform 0 appearing at the Q output of flip-flop 371 is a delayed replica of the waveform N. The output of logic switch 370 and the Q output of flip-flop 371 are applied to X-OR gate 372. X-OR gate 372 produces a logical 1 level in waveform P on lead 374 whenever waveforms N and O are different. Waveform P contains a pulse coincident with every state change of waveform N. The $\overline{Q}$ output of flip-flop 371 is applied to X-OR gate 395 on line 376 and the output of X-OR gate 372 is applied to counter 380 and sample and hold circuit 360.

Computing logic 350 performs the mathematical operations indicated on the right-hand side of Equation (2). Subtractor 352 subtracts the output of adder 330A appearing on lines 331A from the threshold number $t_0$ generated by threshold number source 351. The difference is the numerator on the right-hand side of Equation (2) and is provided to the numerator input of divider 357 on lines 354. Subtractor 353 subtracts the output of adder 300A appearing on lines 331A from the output of adder 300B appearing on lines 331B. This difference, corresponding to the denominator on the right-hand side of Equation (2), is provided to the denominator input of divider 357 on lines 355. Divider 357, a conventional parallel divider employing a nonrestoring division technique, divides the number appearing on lines 354 by the one appearing on lines 355. A multiplication by the interpolating interval would complete the calculation of the right-hand side of Equation (2). Without seriously degrading operation, it is possible to multiply instead by $m$, the average time between transitions in the input FSK signal; in this case, the number of clock pulses occurring between transitions of a 1,170-Hz signal (27 clock pulses). Multiplier 358 is a combinatorial circuit, designed by conventional methods, which produces the desired multiplication by the constant 27 of the numbers provided by divider 357. The number produced by multiplier 358 is applied to sample and hold circuit 360 on lines 359.

Sample and hold circuit 360 samples the number appearing on lines 359 in the presence of a pulse on line 363 and between such pulses retains the number sampled and displays it to comparator 390 on lines 365. This circuit is identical to a sample and hold circuit 310.

Counter 380 counts clock pulses under the control of comparator 390 and subject to resetting by pulses appearing on line 374. It is identical to a counter 300 except that lead 386E, instead of being wired to the logical 1 level, is connected to the output of comparator 390 through inverter 383 and leads 391 and 387. As a result, when the output of comparator 390 is low, the signal on lead 386E is high and counter 380 counts up on successive clock pulses as do counters 300. However, when the comparator output is high, the signal on lead 386E is low, 00000 is added to the outputs of NOR gates 381 and counter 380 maintains a constant number on leads 385.

Comparator 390 senses the readouts of sample and hold circuit 360 and counter 380, represented respectively by analog waveforms Q and R in FIG. 5B, providing a logical 1 or a logical 0 in waveform S on lead 391, depending on whether the two input numbers are the same or not. In addition to inverter 383, the output of comparator 390 is provided to X-OR gate 395 via lead 391.

X-OR gate 395 operates on the $\overline{Q}$ output of flip-flop 371 appearing on lead 376 and the output of comparator 390. Effectively, X-OR gate 395 inverts the signal on lead 376 when the output of comparator 390 is high and will transmit this signal uninverted when the comparator output is low. Waveform T appearing on lead 16 is the output signal of the demodulator.

Referring to FIG. 5B, it can be seen that, prior to the occurrence of a pulse in waveform P, waveforms Q and R are equal. Consequently, waveform S at the output of comparator 390 is high and the $\overline{Q}$ output of flip-flop 371 is inverted by X-OR gate 395, making the condition of waveform T the same as that of waveform O. By tracing dashed line 505 in waveform M it can be seen that a data state change occurs $\tau$ clock pulses after transition 504; but since no change can occur in waveform M until transition 506, no state change is detected until that time. When transition 506 finally occurs, waveform N at the output of subtractor 312 goes high immediately producing the pulse in waveform P. On the next clock pulse, waveform Q at the output of sample and hold circuit 360 assumes the value calculated by computing logic 350 and, because the output of comparator 390 is still high, counter 380 is reset to 00000 as indicated in waveform R. Since waveforms Q and R at the input to comparator 390 have become unequal, comparator output waveform S goes low. Now the $\overline{Q}$ output of flip-flop 376 (the complement of waveform O) is transmitted uninverted by X-OR gate 395 and waveform T on line 16 does not exhibit the state transition in waveform O. Also, when waveform S goes low, the signal on lead 386E goes high and counter 380 begins counting as indicated by the staircase portion of waveform R. $\tau$ clock pulses later, when waveform R reaches the value $\tau$ of waveform Q, comparator output waveform S goes high, disabling counter 380 and causing X-OR gate 395 to begin inverting the $\overline{Q}$ output of gate 371. As a result, waveform T assumes the same state as waveform O, producing a replica of the transition in waveform O delayed by $\tau$ clock periods. The overall effect is to place the transition in waveform T in proper phase position, but one-half cycle later than it occurred in the FSK input signal. It should be noted that according to the mode of circuit operation exemplified by FIG. 2, the duration measurement of the preceding cycle is completed coincidentally with alternate zero crossings of the carrier signal (all of the same sense) whereas in the mode of operation exemplified by FIGS. 5A and 5B duration measurement of the preceding cycle is completed coincidentally with every zero crossing of the carrier signal. When the latter method is employed, it is clear from FIG. 3A that the duration measurements completed on positive and negative transitions are computed independently by the identical A-suffixed and B-suffixed equipment groups of FIG. 3A. To achieve an improvement in noise immunity, the overlapping duration measurements completed coincidentally with consecutive carrier signal transitions are averaged. Adders 330 produce a signal representing this average.

It should be apparent that when the method of FIG. 2 is embodied by apparatus of the type shown in FIG. 3A the dual equipment groups are unnecessary. Only one of the equipment groups, for example, the A-suffixed one, is needed. Thus, adders 330 can be eliminated in such a modified apparatus and the two most recent duration measurements would appear on lines 311A and 316A which, in the modified apparatus, would connect directly to lines 331A and 331B. For this embodiment, FIG. 3B would be unchanged.

Figure 7:
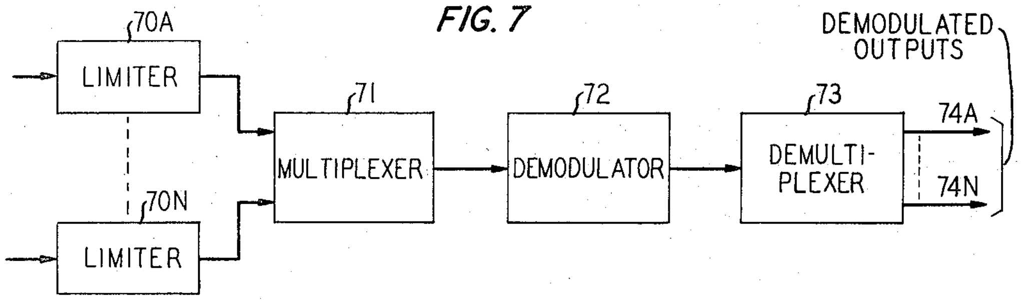
FIG. 7 is a generalized block diagram illustrating the application of the time-multiplexing principle to a single FSK demodulator in a multichannel system according to this invention.

FIG. 7 illustrates an arrangement for time-sharing the demodulator of this invention. FSK signals received on different channels are squared up in limiters 70. Multiplexer 71 interleaves samples from each limiter to produce a time-division multiplexed combination of the individual FSK signals. Demodulator 72, according to this invention, produces a signal which is a time-division multiplexed combination of the demodulated FSK signals. Demultiplexer 73 then reverses the multiplexing operation to yield the individual demodulated signals on lines 74.

Figure 8:
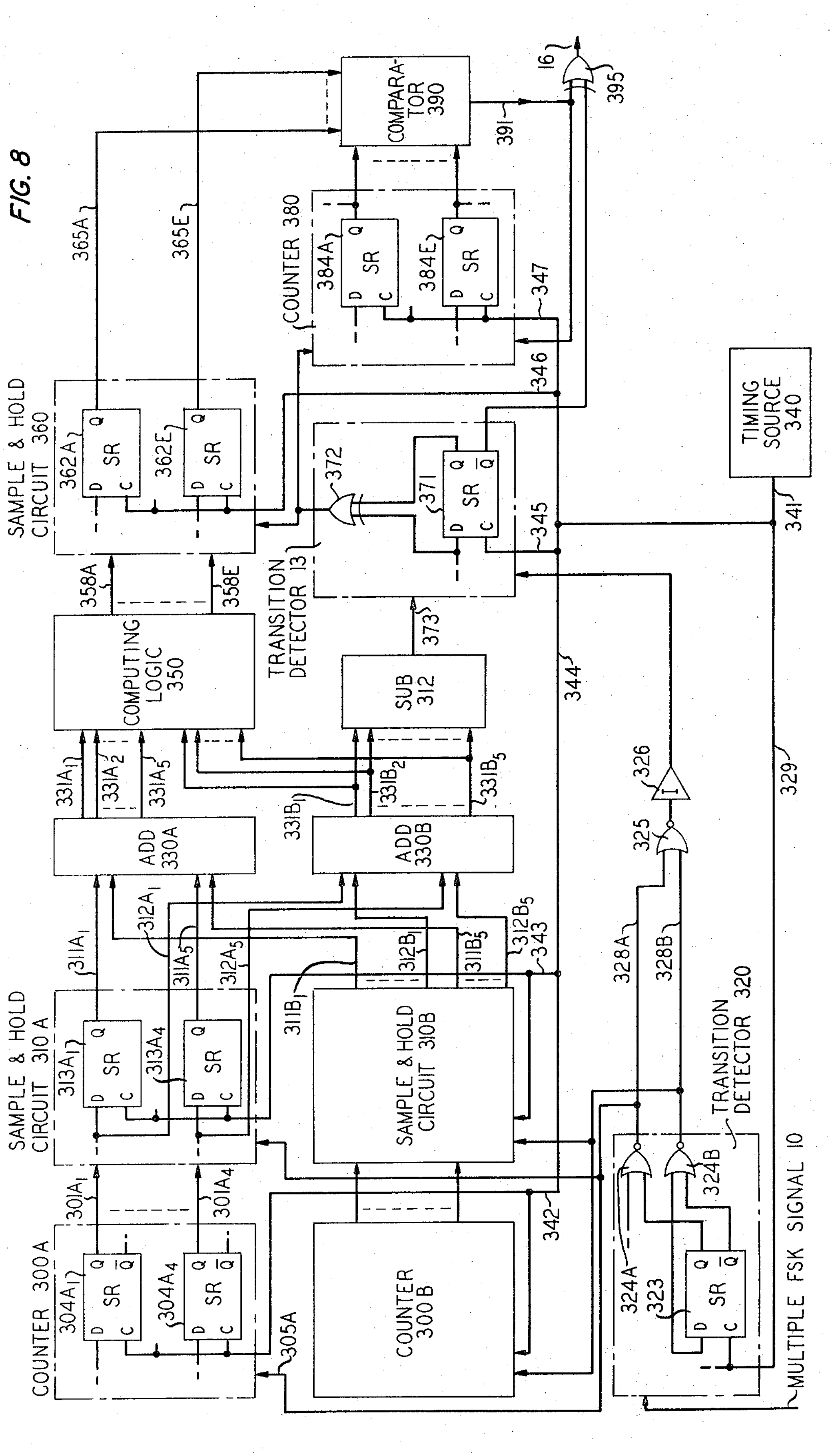
FIG. 8 is a more detailed block diagram of an illustrative embodiment of a multichannel FSK demodulator according to this invention.

FIG. 8 is a block diagram of an embodiment of this invention which can be employed in the configuration shown in FIG. 7. To obtain a demodulator which can be time shared among N FSK signals, each flip-flop in the schematic diagram of FIGS. 3A and 3B except flip-flop 322 is replaced by an N stage register and the clock rate is increased N times. Thus, the shaft-registers of FIG. 8 replace the flip-flops of FIGS. 3A and 3B having the same numbers. Operation is identical to the single channel case except that the shift registers store one sample for each channel. Thus, when a sample for a particular channel appears in its correct time at the input to the demodulator, bits associated with that sample appear at the inputs to all the shift registers and bits associated with the previous sample for the same channel appear at the outputs of all the shift registers. Consequently, operation proceeds exactly as it did for the single channel case.

While this invention has been disclosed in terms of a particular illustrative embodiment, it will be apparent to those skilled in the art that many modifications, such as the substitution of a single random access memory for all the shift registers in the multichannel embodiment, are possible within the spirit and scope of the disclosed principle.

What is claimed is:

1. In a communications system encoding the states of a digital data signal in the discrete frequencies assumed by a transmitted carrier signal, a demodulator for recovering said data signal states from said carrier signal comprising means for measuring the duration of each cycle of said carrier signal, means for resolving each duration measurement into a corresponding data-signal state, means jointly responsive to a change in resolved data-signal states and to the two most recent duration measurements for estimating the delay interval between the intermediate carrier-signal transition and the true data-state transition, and variable means controlled by said estimating means for producing an output data transition delayed from the most recent carrier-signal transition by said estimated delay interval.

2. The demodulator of claim 1 in which said duration measuring means performs duration measurements between alternate zero crossings of one sense only of said carrier signal and comprises a timing source providing clock pulses at a repetition frequency substantially higher than the highest frequency assumed by said carrier signal, a transition detector responsive to said carrier signal for providing pulses coincident with alternate zero crossings thereof, means resettable by pulses from said transition detector for counting said clock pulses, and means responsive to pulses from said transition detector for storing the counts corresponding to the two most recent duration measurements.

3. The demodulator of claim 1 in which said duration measuring means performs separate measurements between all positive-going and between all negative-going zero crossings of said carrier signal and comprises a timing source providing clock pulses at a repetition frequency substantially higher than the highest frequency assumed by said carrier signal, a transition detector responsive to said carrier signal for providing first and second pulse trains corresponding to respective positive-going and negative-going zero crossings of said carrier signal, first counting means resettable by pulses from said first pulse train for counting said clock pulses, second counting means resettable by pulses from said second pulse train for counting said clock pulses, first sampling means responsive to pulses of said first pulse train for sampling and storing counts corresponding to the two most recent duration measurements between consecutive positive-going zero-crossing transitions, second sampling means responsive to pulses of said second pulse train for sampling and storing counts corresponding to the two most recent duration measurements between consecutive negative-going zero-crossing transitions, first means for averaging corresponding counts for the most recent overlapping measurements derived from said first and second sampling means, and second means for averaging corresponding counts for the next prior overlapping measurements derived from said first and second sampling means.

4. The demodulator of claim 1 in which said estimating means comprises a transition detector responsive only to the zero crossing of said carrier signal coincident with a change in said resolved data signal states, first subtracting means for taking the difference between the duration measurement obtained before a threshold duration is reached and such threshold measurement, second subtracting means for taking the difference between consecutive duration measurements straddling the threshold duration, division means for obtaining the quotient between the outputs of said first and second subtracting means, and multiplying means for generating the delay interval between said coincident carrier signal transition and said true data-state transition as the product of said quotient and a duration corresponding to said threshold measurement.

5. The demodulator of claim 1 in which said variable delay unit comprises sample and hold means for storing the count corresponding to said delay interval, counting means whose count is initiated by said intermediate carrier-signal transition, and comparator means responsive to the coincidence of the count output of said counting means with the count from said sample and hold means for generating said output data transition.

6. In a receiver for a frequency-shift keyed data transmission system in which sequential samples of the waves in a plurality of channels are time-division multiplexed into a serial bit stream, a demodulator comprising means for comparing the binary significance of bits corresponding to consecutive samples of each of the waves encoded in said bit stream to detect the occurrence of transitions defining the zero crossings of each frequency cycle for each channel, means for sequentially counting between transitions consecutively detected in the several channels as a measure of the duration of consecutive frequency cycles for each channel, means responsive to said transitions for storing duration counts derived by said counting means from each of said channels, means for resolving the counts between said transitions in each channel into a sequence of corresponding data states, means responsive to a change in consecutive data states in each channel for interpolating between the stored and present duration count for each channel to determine delay values between channel wave transitions and true data state transitions, and means for sequentially applying the delay values determined for the several channels to the most recent transition of each channel wave to generate output data transitions.

7. The method of demodulating a received frequency-shift keyed data signal so as to reduce phase jitter in the demodulated signal comprising the steps of measuring the duration of each cycle of said received signal, resolving each one of said duration measurements into a corresponding state of said data signal, interpolating between consecutive duration measurements which correspond to unlike data states to determine a delay interval separating the received-signal transition intermediate said consecutive duration measurements and the true data-signal transition, and producing a digital output signal transition delayed from the most recent received-signal transition by the delay interval determined in said interpolation step.

8. The method of claim 7 in which the duration of a received-signal cycle is taken as the average of overlapping measurements between consecutive pairs of alternately positive-going and negative-going zero crossings of said received signal.

9. The method of claim 7 in which the duration of a received-signal cycle is measured between consecutive zero crossings of the same polarity-seeking direction.

10. In an apparatus resolving the cycles of a frequency variant received signal into the discrete values of a digital signal by measuring the duration of said cycles, the method of reducing the phase jitter in said digital signal comprising the steps of:

when one of said cycles is resolved to a different one of said values than the immediately preceding cycle, estimating the delay interval between the start of said cycle and the true transition in value of said digital signal, and delaying said digital signal by an amount equal to the estimated delay interval.

11. In an apparatus for resolving the cycles of a frequency variant received signal into the discrete values of a digital signal, said apparatus including means for measuring the duration of said cycles, an improvement for reducing phase jitter in said digital signal comprising:

means responsive to a change in said digital signal for estimating the delay interval between the start of the most recently completed one of said cycles and the time during said cycle that the time transition in said digital signal should occur, and variable means controlled by said estimating means for delaying said digital signal by an amount equal to said delay interval.

* * * * *